Nov. 26, 1946.  H. F. ELLIOTT  2,411,617
ELECTRIC CONTROL APPARATUS
Filed July 16, 1940   9 Sheets-Sheet 1

Inventor:
Harold F. Elliott
By: Foorman L. Mueller
Atty.

Nov. 26, 1946.  H. F. ELLIOTT  2,411,617
ELECTRIC CONTROL APPARATUS
Filed July 16, 1940  9 Sheets-Sheet 3
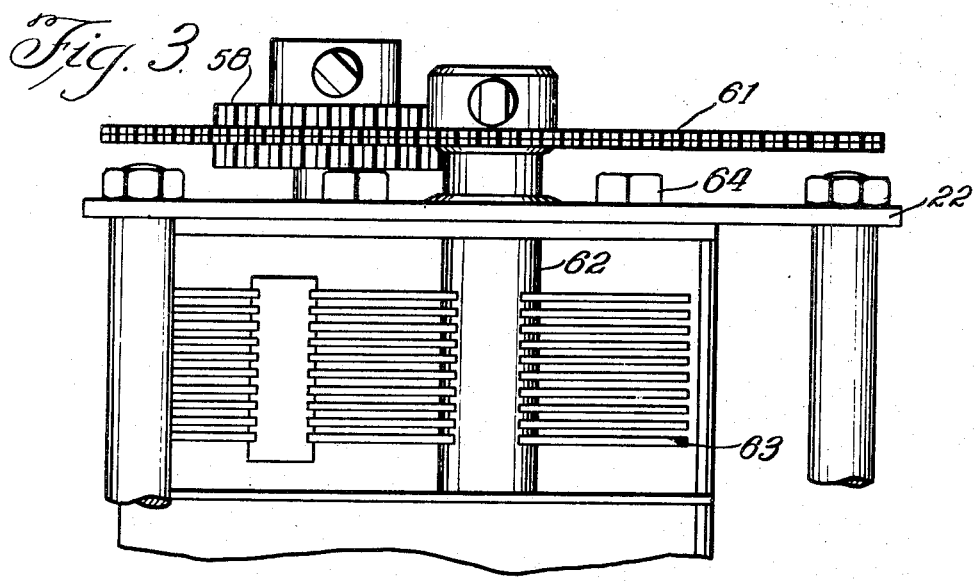
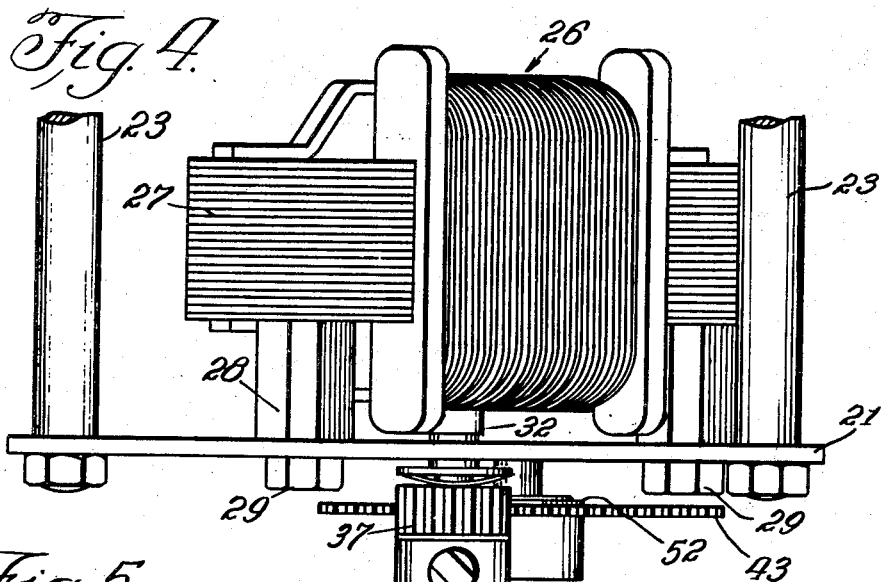
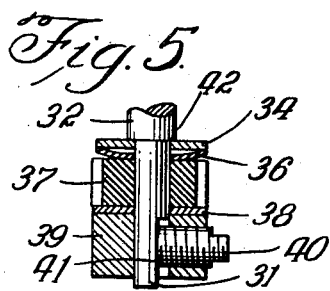
Inventor:
Harold F. Elliott Nov. 26, 1946.   H. F. ELLIOTT   2,411,617
ELECTRIC CONTROL APPARATUS
Filed July 16, 1940   9 Sheets-Sheet 4

Inventor
Harold F Elliott
By: Toorman L Mueller
Atty.

Inventor:
Harold F. Elliott
By: Foorman L. Mueller
Atty.

Nov. 26, 1946.  H. F. ELLIOTT  2,411,617
ELECTRIC CONTROL APPARATUS
Filed July 16, 1940  9 Sheets-Sheet 6
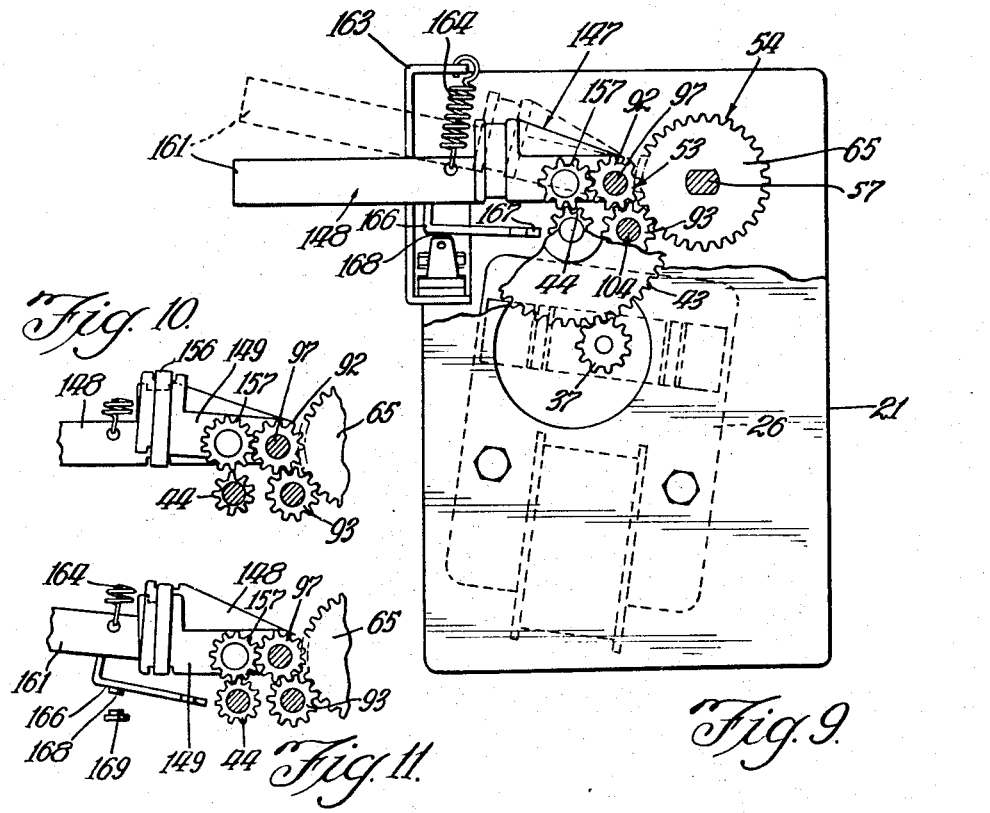
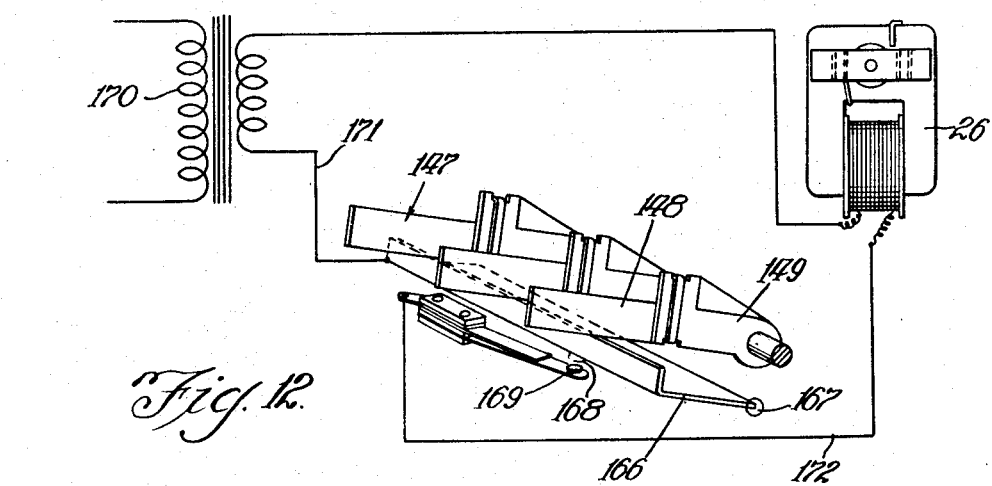
INVENTOR.
Harold F. Elliott
BY Norman L. Mueller
Atty.

Nov. 26, 1946.                H. F. ELLIOTT                2,411,617
                       ELECTRIC CONTROL APPARATUS
                         Filed July 16, 1940          9 Sheets-Sheet 7
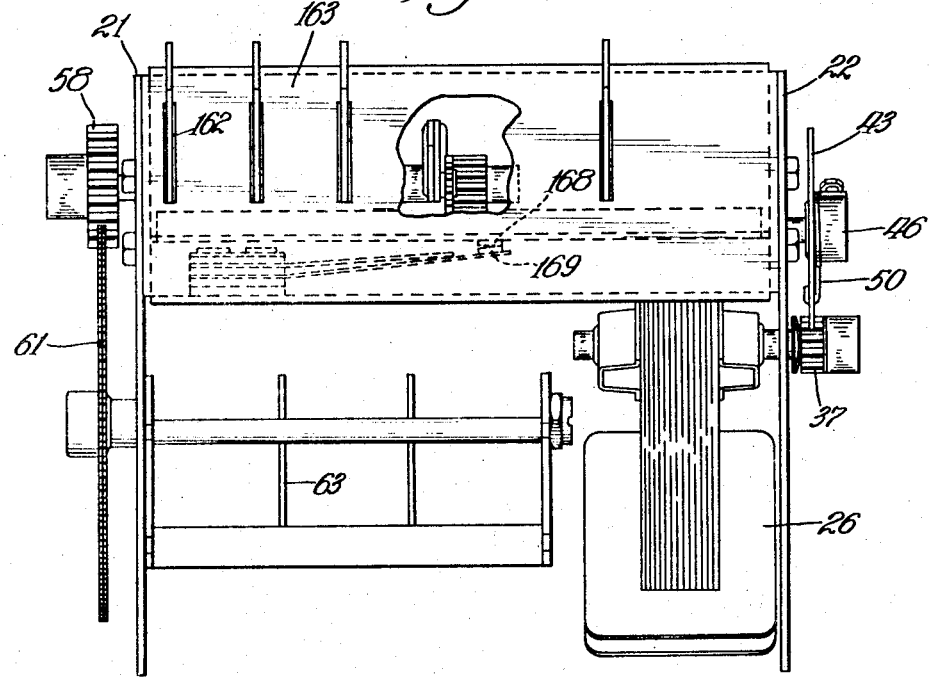
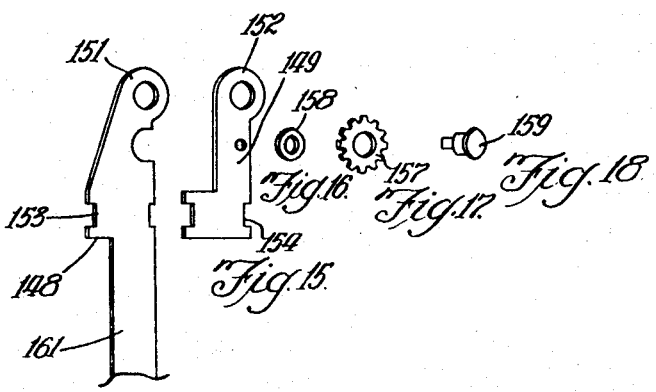
INVENTOR.
Harold F. Elliott
BY Foorman L. Mueller
                Atty.

Nov. 26, 1946. H. F. ELLIOTT 2,411,617
ELECTRIC CONTROL APPARATUS
Filed July 16, 1940 9 Sheets-Sheet 8
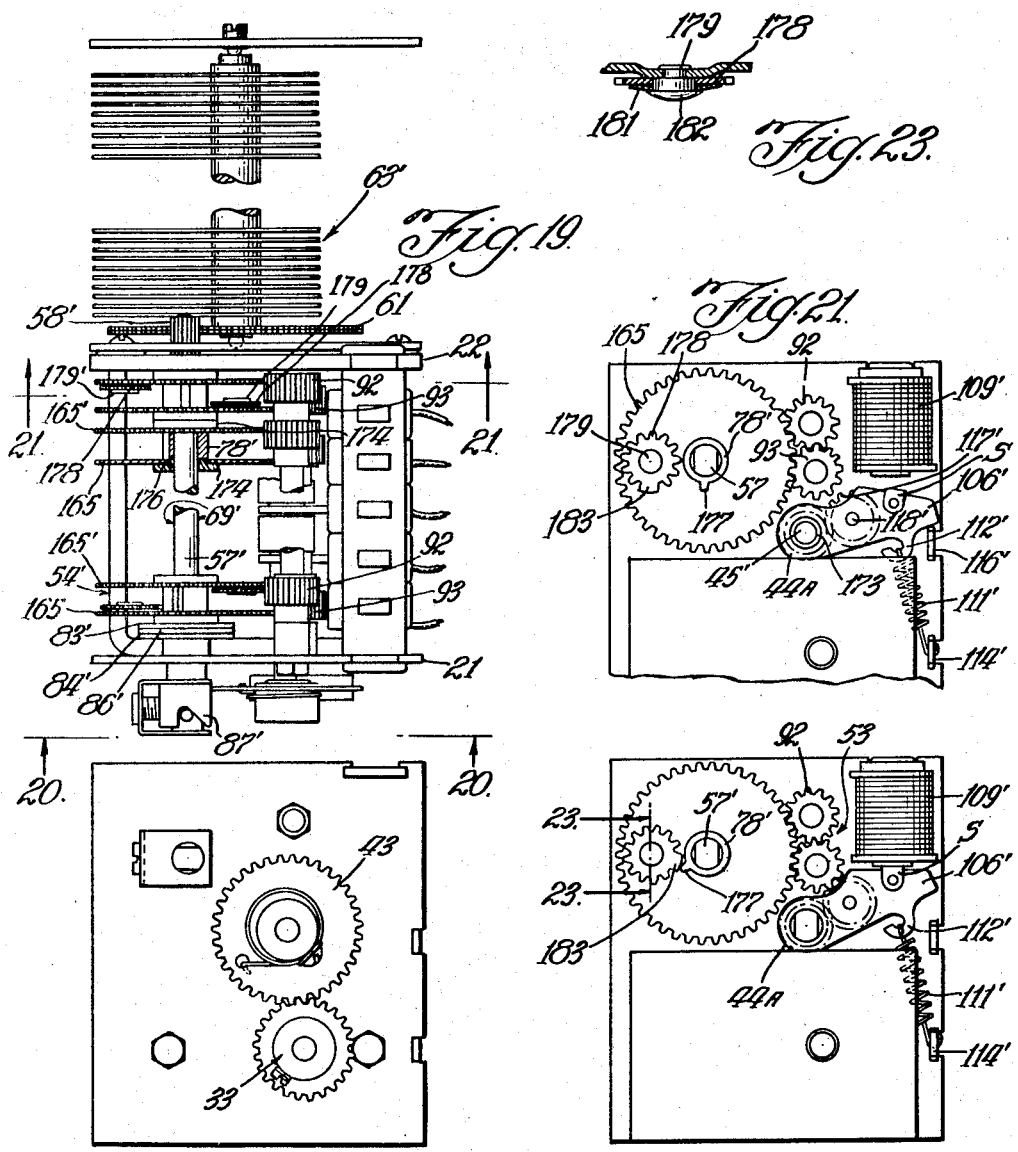
INVENTOR.
Harold F. Elliott
BY
Atty.

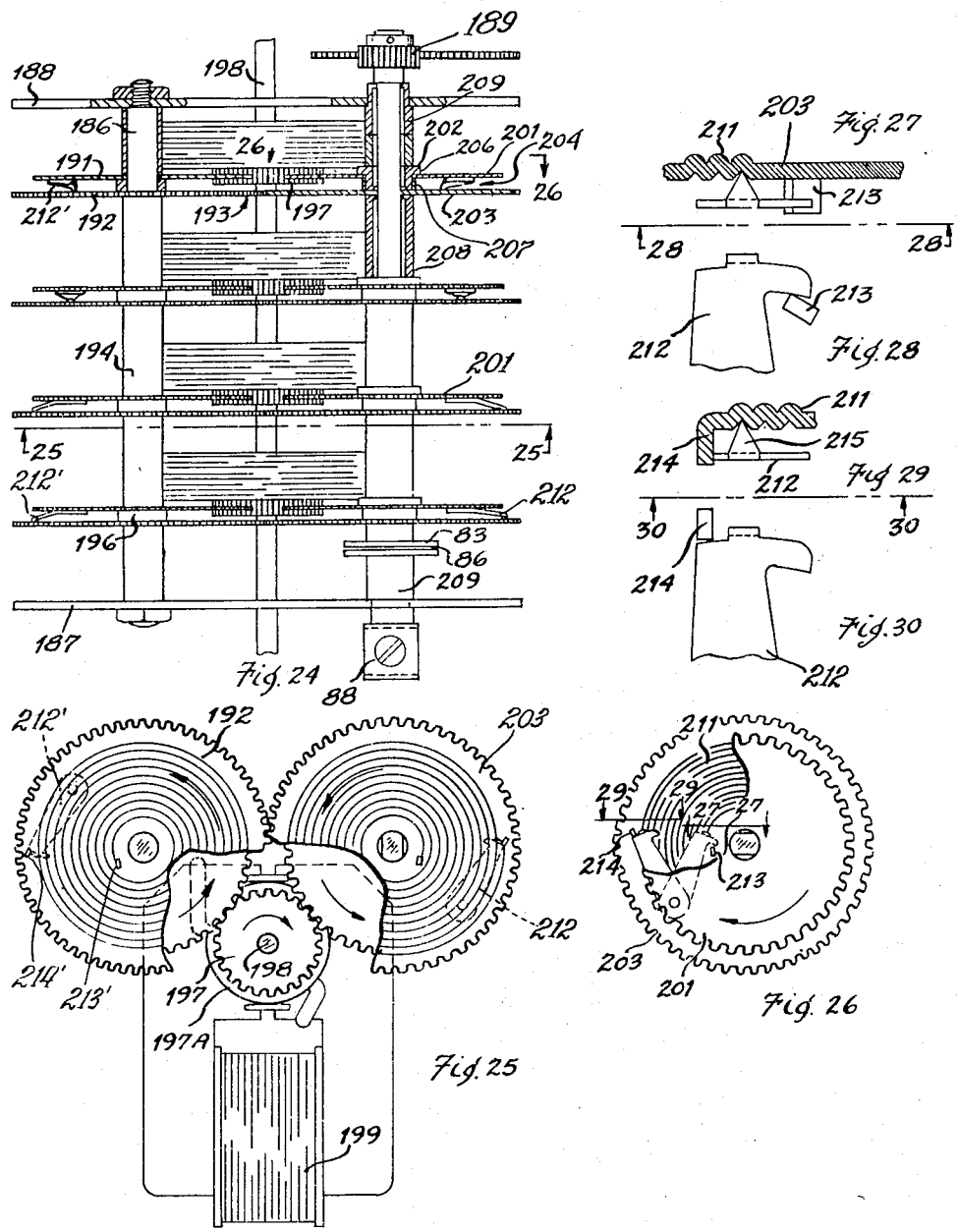

Patented Nov. 26, 1946

2,411,617

UNITED STATES PATENT OFFICE 2,411,617

ELECTRIC CONTROL APPARATUS

Harold F. Elliott, Chicago, Ill.

Application July 16, 1940, Serial No. 345,762

4 Claims. (Cl. 192—142)

This invention relates to control apparatus and in particular to an automatic tuning system for radio receiving apparatus.

It is an object of this invention to provide an improved automatic tuning system for radio receiving apparatus.

A further object of this invention is to provide a physically compact tuning device, which is simple, inexpensive, efficient in operation and of preassembled unit construction.

Another object of this invention is to provide an electrical tuning system in which each of a plurality of control units for driving a rotary control shaft in operative engagement with frequency changing means, is constructed to move the frequency changing means through its entire tuning range with a relatively low driving ratio to effect a precision tuning thereof.

Another feature of this invention is the provision of electrical tuning apparatus in which the actuating magnets are equally efficient in either A. C. or D. C. systems without the necessity of changing the pole structures thereof; the structure operated by the magnets being assembled in a manner to eliminate the usual chattering action of the unshaded magnets when used in an A. C. system. Similar magnets may thus be used for both types of systems whereby to further reduce the cost of the tuning apparatus.

Yet another feature of this invention is found in the provision of a tuning unit in which the operating parts are arranged to form an integral part of the frame means for the unit.

Another feature of this invention is the provision of a tuning device in which a manually actuated clutch unit for connecting a rotary control unit with a motor driven driving member is arranged to close the energizing circuit of the motor after its clutching operation, whereby to immediately operate the control unit.

Yet another feature of this invention is the provision of control apparatus in which a rotary control shaft is rotated in either direction of rotation by a rotary control unit operated by a unidirectional motor.

A further feature of this invention is the provision of control apparatus in which each of a plurality of control units for driving a rotary control shaft to a predetermined control position is provided with an operating motor with the motors being arranged in a common control circuit for selective energization.

Further objects, features, and advantages of this invention will become apparent from the following specification when taken in connection with the accompanying drawings in which:

Fig. 3 is a fragmentary bottom view showing the frequency changing means and its driving engagement with the rotary control means;

Fig. 4 is a fragmentary bottom view of the driving motor and its associated clutch assembly;

Fig. 5 is a fragmentary detailed sectional view of the driving end of the motor shaft;

Fig. 9 is an end view illustrated similarly to Fig. 2 showing a manually operated clutch unit for the rotary control units;

Fig. 10 is a fragmentary view of the clutch unit in one of its operating positions;

Fig. 11 is a view illustrated similarly to Fig. 10 showing the parts thereof in changed position;

Fig. 12 is a somewhat diagrammatic illustration of a control circuit for the tuning device of Fig. 9;

Fig. 13 is an elevational view looking toward the right as viewed in Fig. 9, with parts thereof removed for the purpose of clarity;

Figure 31:
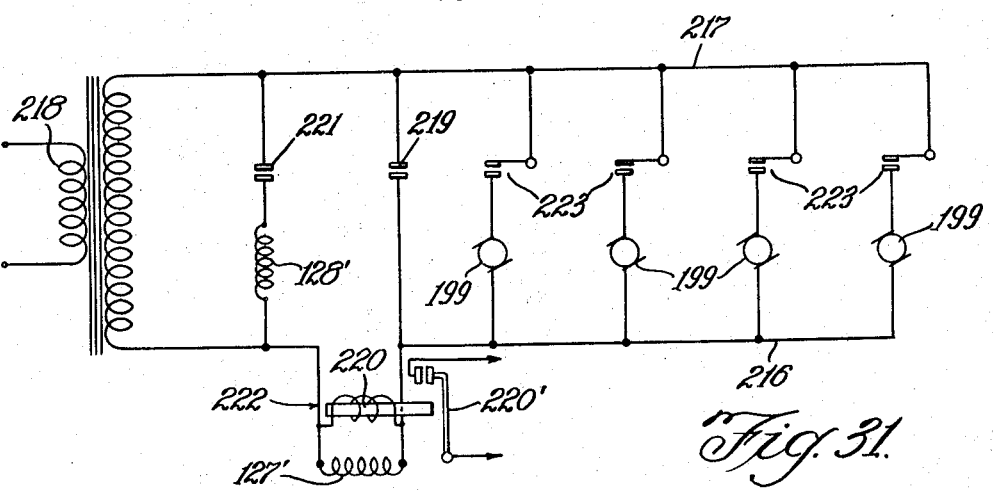
Figure 32:
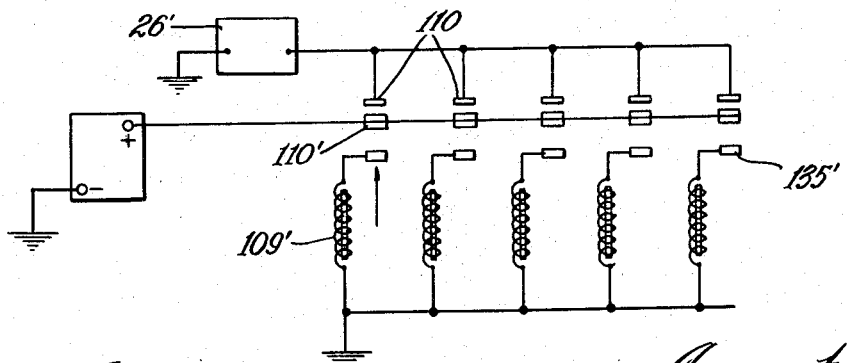

Figs. 14–18, inclusive, are detail showings of the clutch unit illustrated in Figs. 10 and 11;

Fig. 19 is a plan view of a modified form of the invention;

Fig. 20 is an elevational view as seen along the line 20—20 in Fig. 19;

Fig. 21 is a fragmentary sectional view as seen along the line 21—21 in Fig. 19;

Fig. 22 is a view illustrated similarly to Fig. 21 showing the parts thereof in changed position;

Fig. 23 is a fragmentary detailed sectional view taken approximately along the line 23—23 in Fig. 22;

Fig. 24 is a fragmentary plan view of another modification of the invention;

Fig. 25 is a sectional view taken along the line 25—25 in Fig. 24;

Fig. 26 is a detail view as seen along the line 26—26 in Fig. 24;

Fig. 27 is an enlarged fragmentary detail view as seen along the line 27—27 in Fig. 26;

Fig. 28 is a fragmentary elevational view taken along the line 28—28 in Fig. 27 showing merely the pivoted arm and one stop;

Fig. 29 is an enlarged fragmentary detail view taken along line 29—29 in Fig. 26;

Fig. 30 is a fragmentary elevational view as seen along the line 30—30 in Fig. 29 showing the pivoted arm at the stop at the opposite end of the operating range as compared with the position of Fig. 28;

Fig. 31 is an electric control circuit for the modified embodiment of the invention shown in Fig. 24; and Fig. 32 is an electric control circuit for the modified embodiment of the invention shown in Figs. 19–23, inclusive.

Figure 1:
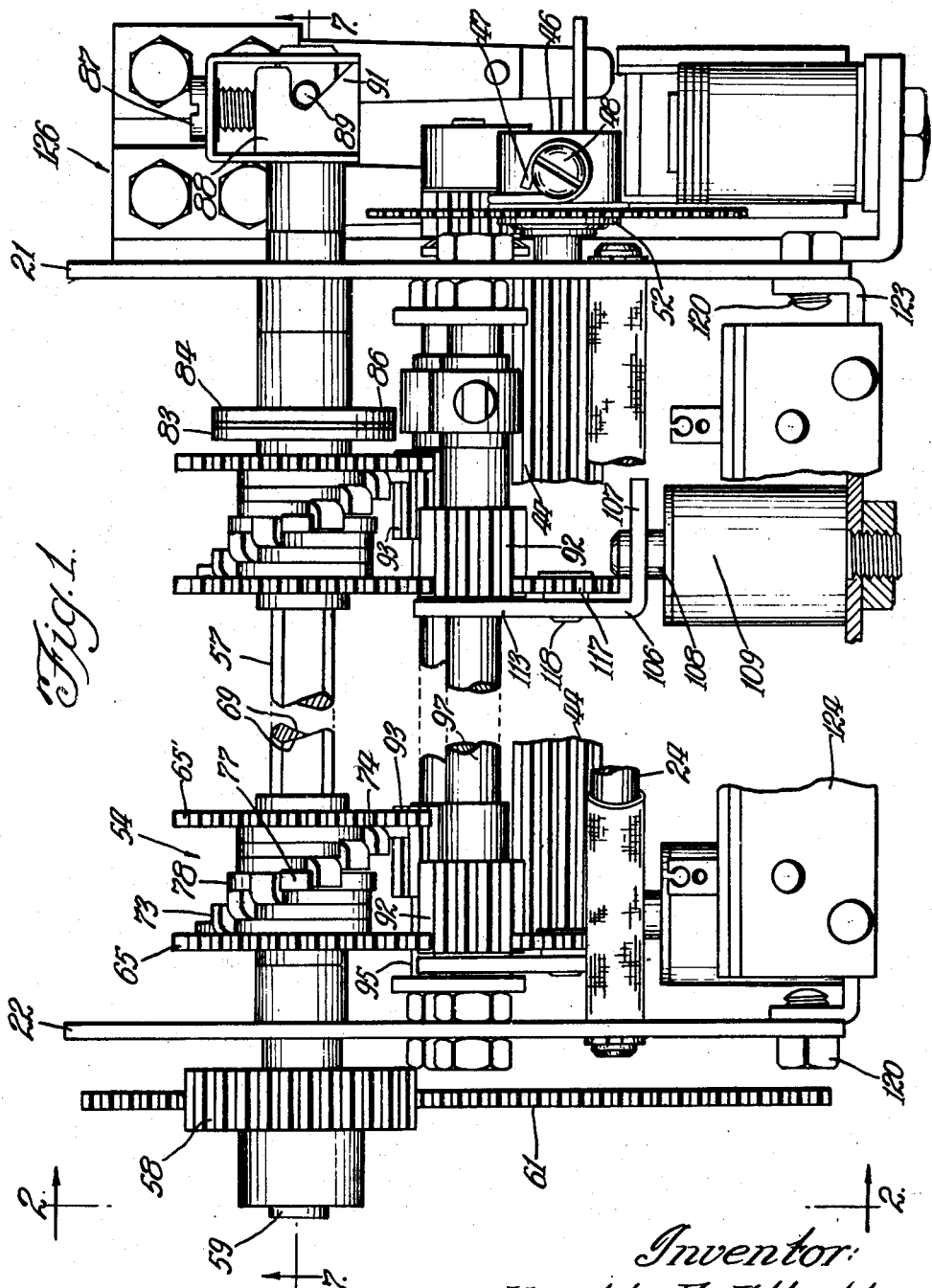
Fig. 1 is a plan view of one embodiment of the invention with parts thereof broken away for the purpose of clarity.
Figure 2:
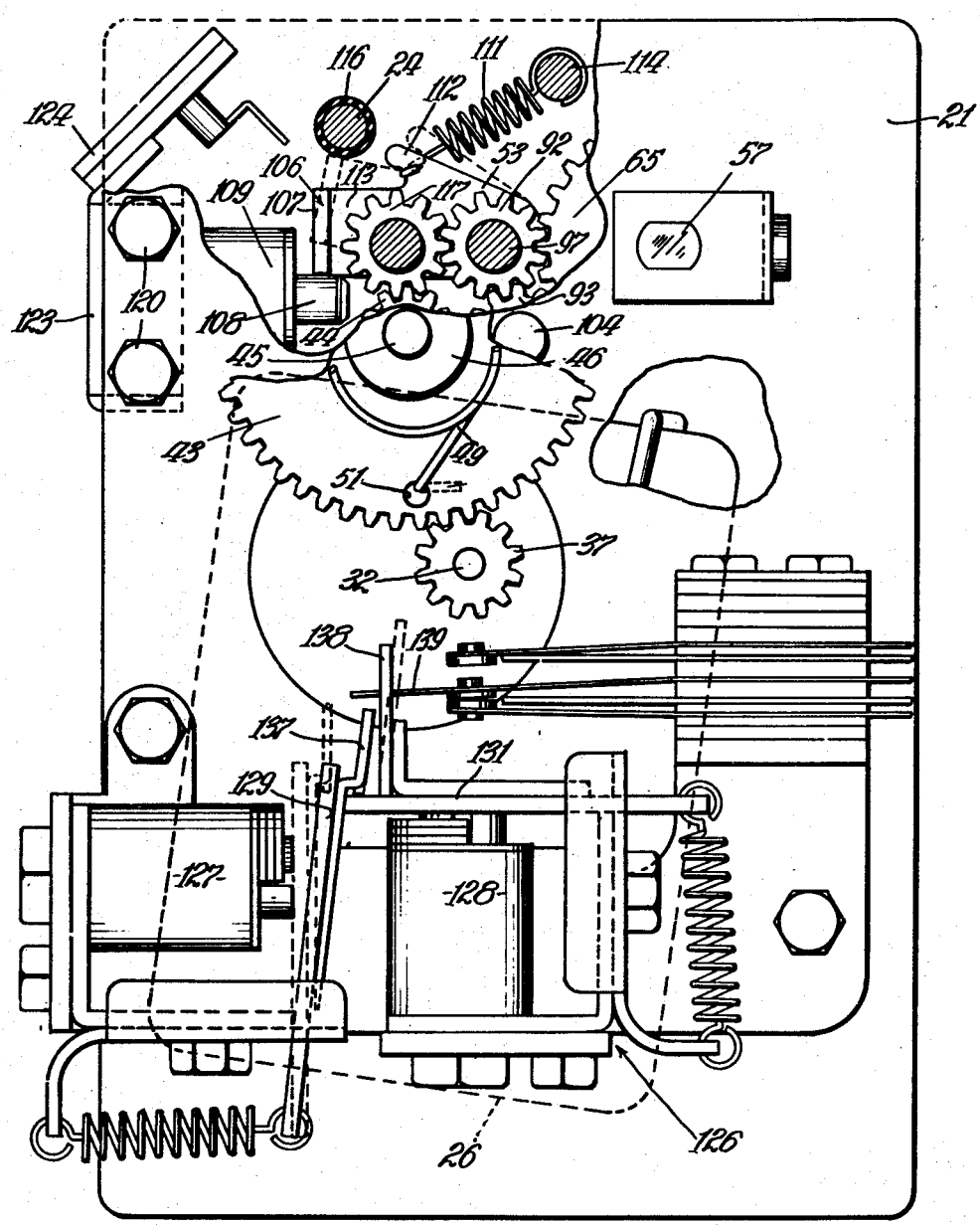
Fig. 2 is an end elevational view looking toward the right as viewed in Fig. 1, with parts thereof broken away to show the driving system for the rotary control means.

Referring to the drawings, the preselector unit shown in Figs. 1, 3, and 4, is seen to include frame means, having end plates 21 and 22, spaced apart by lower tie rods 23 and an upper tie rod 24. A uni-directional driving motor 26 is mounted on the end plate 21 by supporting studs extended through the laminated motor field structure 27. The motor is positioned away from plate 21 by spacers 28 and secured in place by nuts 29. End 31 of the motor shaft 32 projects through the plate 21 and has mounted thereon a clutch assembly 33, which includes a steel washer 34, a spring washer 36, a pinion gear 37, a fibre friction washer 38 and an assembly retaining bushing 39. The shaft end 31, as clearly shown in Fig. 5, is of reduced section and is formed with a flat 41 near the outer extremity thereof. The shoulder portion 42 serves as a stop or abutment for the washer 34 to define the inner position of the clutch assembly 33, with the flat portion 41 frictionally engaging the set screw 40 of the retaining bushing 39 to positively maintain the clutch assembly 33 on the motor shaft 32. Gear 37 is in driven engagement with a gear 43 which is mounted at one end of a supporting shaft 45 for an elongated pinion gear 44 (Figs. 1 and 2). It is contemplated that gear 43 be of fibre or other like composition material. Gear 43 rotates the shaft 45 through a spring connection with a retaining bushing 46. The looped end 47 of the coil spring 50 is connected to a friction screw 48 (Fig. 1) which holds the bushing 46 in a fixed position relative to the pinion shaft 45. The opposite end 49 of the spring is hooked into an aperture 51 formed in the face of the gear 43. The spring connection of the gear 43 to the bushing 46 thus provides a flexible drive between the motor shaft 32 and the pinion gear shaft 45 and prevents any possible "freezing" together of the clutch gears 117 and 44 as will be explained later. A steel washer 52 holds the gear 44 loosely upon hub 46 so that it is free to rotate relative to the hub within the limit imposed by spring 50.

The elongated pinion gear 44 is arranged for driving engagement with gear trains 53, one of which is provided for driving each of the rotary control units 54. The units 54 are mounted on a rotary control shaft 57 which is rotatably supported in the end plates 21 and 22. A gear 58 mounted on the shaft 57 near its end 59 is in operative engagement with a condenser gear 61 which is mounted on the condenser shaft 62 (Figs. 1 and 3). The condenser 63 is supported on the end plate 22 by suitable screw means 64 or the like. Although the condenser 63 is illustrated as being a gang condenser it is to be understood that other frequency changing means may be used with equal satisfaction. The motor 26 is thus seen to be in driven engagement with the condenser 63 through the mechanism above described, the extent of condenser rotation for tuning purposes being controlled by rotation of the control shaft 57 in a manner now to be described.

Figure 7:
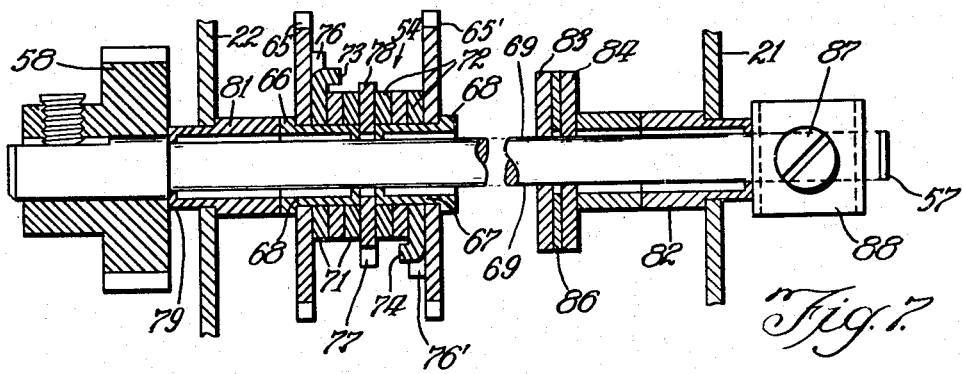
Fig. 7 is a sectional view of the rotary control means showing the arrangement thereon of the rotary control units.

The control units 54 are similarly constructed and are mounted in succession axially of the control shaft 57 (Figs. 1 and 7). Each unit includes a pair of similar gears 65 and 65' mounted on similar bushings 66 and 67 having annularly extending shoulder portions 68. The bushings are broached on the inside thereof in conformance with the flats 69 formed on the control shaft 57, so as to be keyed to the shaft. Gear 65 and washers 71, three in number, are freely rotatable on the bushing 66; and gear 65' and washers 72, also three in number, are freely rotatable on the bushing 67. The washers 71 and 72 are similar, the projections 73 and 74, respectively, formed thereon extending axially toward each other. The projections 73 and 74 are of a length somewhat less than the thickness of the washers 72 and 73 so that the projections on adjacent washers only are engageable. Thus on rotation of gear 65 the projection 76 integrally formed thereon engages the projection 73 on the next adjacent washer 71, with the projections or fingers 73 on the remaining washers 71 being successively engaged on continued rotation of the gear 65 until a coupled engagement of the gear 65 is made with the radially extending projection 77 formed on a center washer or adjustable collar member 78 arranged between the bushings 66 and 67. Rotation of gear 65' provides for a similar operation of the washers 72 into engagement with the projection 77, for a purpose to be later explained. The member 78 is normally freely rotatable on the control shaft 57, so as to be adjustable to a predetermined position in correspondence with a particular control position of the shaft. The adjusted position of the member 78 is maintained by its frictional engagement with the adjacent ends of the bushings 66 and 67, as will be explained. The coupled engagement of both gears 65 and 65' through their respective washers 71 and 72 with the adjustable collar member 78, defines the predetermined control position of the shaft, 57, as will be later fully explained.

As shown best in Fig. 7, the portion of the control shaft 57 carrying the pinion gear 58 is of enlarged section to form a shoulder 79 on the shaft. A spacing member 81 keyed to the shaft 57 and pressed against the shoulder 79 positions the control units 54 and gear 58 away from the end plate 22 while a similar unit 82 spaces the control units and a clamping unit 88 away from the end plate 21. In assembly, therefore, the spacers 81 and 82 and units 54 are mounted on the reduced section of the shaft 57 and strung over the length thereof in a proper assembly order prior to the positioning of the shaft in the end plates 21 and 22. Conditioning of the units 54 to provide for a predetermined positioning of the center washers 78 relative to the shaft 57 is accomplished by the two washers 83 and 84 which have a spring washer 86 located therebetween. On separation of the washers 83 and 84 the spring is released until the control members 78 for each of the units 54 are permitted to rotate under but slight pressure from the spring 86 on the shaft 57, so as to be freely movable to an adjusted position, as will be explained. On a clamping together of the washers 83 and 84 the bushings 66 and 67 in each control unit are frictionally pressed toward each other to engage opposite sides of the member 78, whereby to clamp the member in the position which it has at the time of such engagement. The clamping action of the washers 83 and 84 is controlled by manipulation of a set screw 87 (Figs. 1 and 7) which is positioned in the thrust member or clamp 88. By virtue of the engagement of pin 89 in the tapered slot 91 formed in the member 88, adjustment of the set screw 87 acts to move the member 88 away from or toward the control units 56 to control the action of the washers 83 and 84 on the spring 86 in a manner which is clearly apparent.

Figure 6:
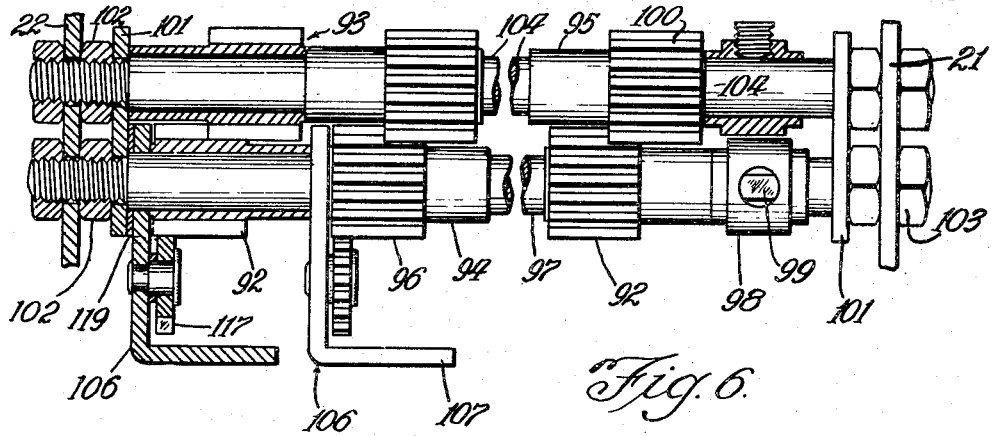
Fig. 6 is a detail view, partly in section, of the gear train for the rotary control units. This detail is illustrated as removed from the structure of Fig. 1 and rotated toward the reader sufficiently to show the shaft and gear relationship more clearly.

The gears 65 and 65' are engageable with pinions 92 and 93, respectively, which are included in each of the gear trains 53 for the units 54. The pinions 92 and 93 are engageable with each other and arranged so as to rotate the gears 65 and 65' in opposite directions on turning of either thereof. The pinions 92 are axially aligned, and freely rotatable on a shaft 97; each pinion 92 (Figs. 1 and 6) is self-spacing and is formed with a spacer portion 94 and a toothed or gear portion 96, the portion 94 being of a length to position each of the toothed portions 96 substantially opposite a gear 65 for each of the control units 54. Assembly of the pinions on the shaft 97 is maintained by a bushing 98 which is frictionally engageable with the shaft through friction screw 99. The threaded ends of the shaft 97 are held by nuts 102 to tie plates 101 and extend through the frame end plates 21 and 22; the nuts 102 serving to hold the tie plates 101 against the pinion assembly and to space the pinions from the end plates 21 and 22. Nuts 103 on the outside of the end plates 21 and 22 fixedly mount the shaft 97 thereon.

The pinions 93 are substantially similar to the pinions 92 and are axially aligned and freely rotatable on a shaft 104 having threaded ends which are mounted in the tie plates 101 and the end plates 21 and 22 in a manner similar to that above described for the shaft 97. The spacer portions 95 are arranged substantially opposite the gear portions 96 of the pinions 92, and the gear portions 100 are substantially opposite the gears 65' and engageable therewith. The shafts 97 and 104 are thus seen to be parallel to each other, with the pinions 92 and 93 arranged substantially opposite a corresponding control unit 54 and in engagement with the gear members 65 and 65' respectively.

Interposed between adjacent pinions 92 is a rocker arm or armature 106 for each unit 54 which is of substantially L-shape and freely rotatable on the shaft 97. As shown in Figs. 1 and 2, the leg portion 107 of each armature is arranged in an attractable position relative to the pole 108 of a magnet 109. The attraction of the armature 106 by the magnet 109 is opposed by a spring 111 which is connected at one end to a projection 112 formed on the armature leg portion 113, and at its opposite end to a tie rod 114 which extends longitudinally of the pre-selector unit and is mounted in the end plates 21 and 22. Spring 111 holds the armature in its normal rest or open position against the tie rod 24 which is suitably cushioned. A pinion or idling gear 117 is freely rotatable on a pin 118 which is supported in the leg portion 113, the pinion 117 being positioned so as to be in continuous meshing engagement with the pinion 92. Movement of the armature through a distance defined by its angular movement between the pole piece 108 and cushioned tie rod 24 is sufficient to move the gear 117 into and out of engagement with the elongated pinion 44, which, as previously explained, is common to all of the control units 54.

Each armature 106 and its associated pinion 117 thus functions as a clutch means for engaging one of the control units 54 with the elongated pinion 44 through the gear train or pinion gears 92 and 93. The pinions 92, 93 and 117 are always in continuous meshing engagement so that an immediate rotation of the gears 65 and 65' is obtained on engagement of the pinion 117 with the elongated pinion 44. A fibre washer 119 (Fig. 6) is mounted about the shaft 97 between the tie plate 101 and adjacent armature 106 to substantially eliminate any vibratory or chattering action of this armature from being transmitted into the frame means on operation of the magnet 109 in an A. C. system. This vibration insulating means is the only one necessary in the entire assembly of the shaft 97 and its associated pinions 92 and armatures 106. The magnets 109 are mounted on a bracket member 123 (Fig. 1) so as to be substantially opposite their corresponding armatures 106. Member 123 is supported on the end plates 21 and 22 by suitable screw means 120 or the like. A terminal panel 124 is secured to the upper portion of the bracket 123 as viewed in Fig. 2, with the panel being suitably insulated from the bracket. Electrical connection of the magnets to the operating electrical system is thus directly made in immediate adjacence to the assembly position of the magnets in the preselector unit.

In the construction of the tuning apparatus or preselector unit as thus far described it is seen that the shafts 97 and 104, and the magnet support 123, while forming component parts of the preselector unit function also as tie rods in supporting the end plates 21 and 22 and thus coact with the tie rods 23 in providing a unit of simple and compact, but rugged design. It is seen also that the corresponding parts for each unit 54 are arranged longitudinally of the preselector unit while each control unit 54 and its component parts are arranged transversely of the preselector unit.

A relay unit 126 (Fig. 2) including operating magnets 127 and 128 for armatures 129 and 131, respectively, is included in the circuit of the magnets 109 and motor 26 and operates to control the starting and stopping of the radio receiving apparatus, as will be explained.

Figure 8:
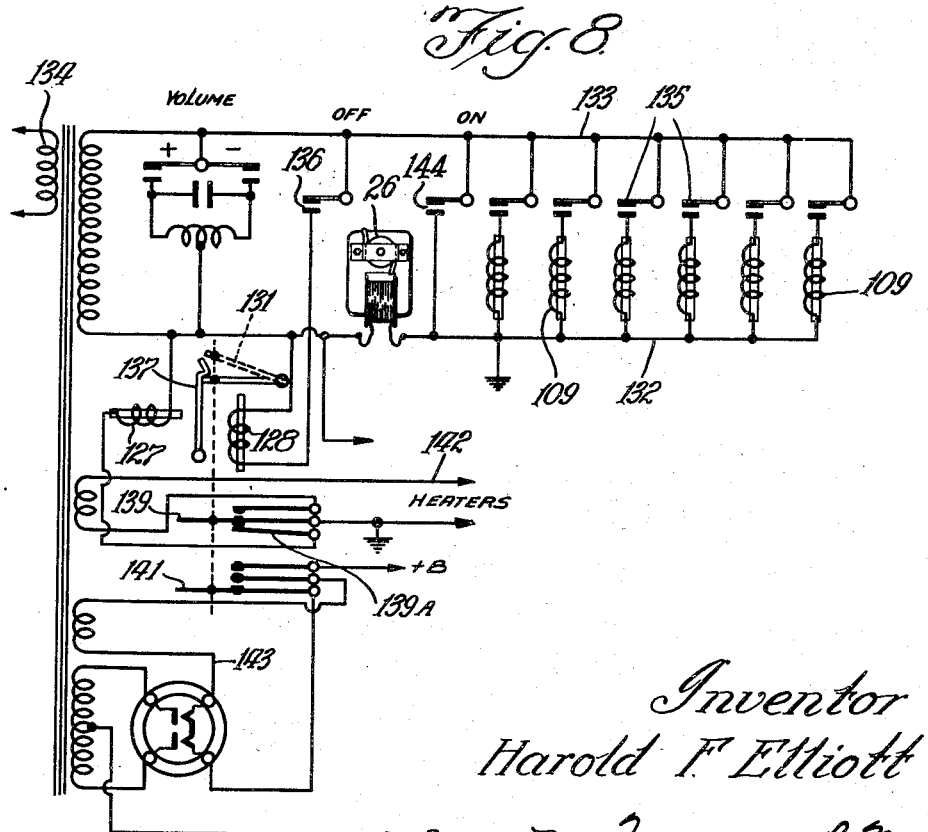
Fig. 8 shows an electric control circuit for the embodiment of Fig. 1.

As shown in the circuit diagram in Fig. 8 the magnets 109 are arranged in parallel between conductors 132 and 133 which are inductively connected to a suitable supply source 134. The motor 26 which is in driving engagement with the elongated pinion 44, as was previously explained, is connected in series with each of the magnets 109 so as to be energized concurrently on energization of each magnet. It is thus seen that rotation of the elongated pinion 44 occurs simultaneously with the actuation of the clutch means 106—117 by the magnet 109 so that selective operation of a control unit 54 is obtained immediately on closing a push button 135.

The radio "off" button or switch 136 is connected in parallel with the magnets 109 and is in series connection with the magnet 128. On actuation of the "off" switch to its closed position the magnet 128 attracts the armature 131 into a locked position with an interlock member 137 so that this initial actuated position of the armature 131 is retained even after the "off" switch 136 is opened. The armature 131 (Figs. 2 and 8) is provided with an arm 138 which is engageable with contacts 139 and 141, the contact 139 controlling the circuit 142 to the radio heaters and the contact 141 the rectifying circuit 143. The radio "on" button or switch 144 is connected in parallel with the magnets 109 and with the "off" switch 136. Operation of the button 144 energizes the magnet 127 to release the interlocking member 137 from its engagement with the armature 131. This releasing of the armature 131 moves the contacts 139 and 141 in a direction to close the circuits to the radio heaters and rectifier so as to condition the radio receiving apparatus (not shown) for broadcast reception. The arrangement of the circuits shown in Fig. 8 is such that the set may also be turned on by pressing any of the tuning buttons as 135, energizing magnet 109 and motor 26. The "on" coil 127 is connected in parallel with motor 26 in a switch leaf 139A whenever the set is off, and so receives energy whenever the motor is energized under this condition. As soon as the latch 131 is stopped and switch 139 moves to the "on" position, this circuit is broken and coil 127 is deenergized.

In the operation of the preselector unit let it be assumed that the "on" switch 144 has been turned on. On actuation of a push button 135, which may be located remotely from the tuning apparatus, the energizing circuit for a magnet 109 is closed through conductors 132 and 133 as is also the circuit of the motor 26 which is connected in series with the magnet. Concurrently with the start of operation of the motor 26 to rotate the elongated pinion 44 through clutch means 33 and gear 43, the gear 117 on the armature 106 is moved into engagement with the pinion 44. The motor 26 is of uni-directional type and the gear train from the motor to the elongated pinion 44 is arranged so that the pinion 44, as viewed in Fig. 2, rotates in a clockwise direction, which in turn rotates the clutch gear 117 in a counter-clockwise direction. This direction of rotation of the pinion 44 acts to pull the gear 117 into meshing engagement with the elongated pinion so that the gear 117 is locked in mesh during the tuning operation. Since this meshing engagement holds the armature 106 in its attracted position against the magnet pole face 108, a mechanical pressure urging the armature toward the pole face occurs concurrently with the electrical attraction of the armature by the pole face to aid the magnet in operating the clutch means 106—117. The magnets 109, therefore, need only be large enough to pull the clutch armature 106 into its attracted position against the pole face 108. This utilization of the mechanical reaction between the gears 44 and 117 provides for the use of relatively small magnets 109, since the magnet merely functions as a tripping means to initially engage the gear 117 and the pinion 44; the pulling of the gear 117 into meshing engagement with the pinion 44 being sufficient to maintain the geared or interlocked engagement between such gears so long as the pinion is rotating. The floating or spring connection of the fibre gear 43 to the pinion shaft 45 assures a positive disengagement between the gears 44 and 117 on completion of a tuning operation. A torsional force is built up in the spring 50 so that when the motor 26 is deenergized the gears 44 and 117 are thrown out of mesh by the return of the spring 50 to its free untensioned position. The constantly applied mechanical pressure on the armature 106 by the operation of the gears 44 and 117 serves further to reduce the chattering action of the armature when the magnet 109 is operating in an A. C. system.

With the pinions 92 and 93 in continuous engagement with each other and with the pinion 92 in engagement also with the gear 117, the pinions 92 and 93 are reversely rotated so as to rotate their associated gears 65 and 65', respectively, in opposite directions on the control shaft 57. As the gears 65 and 65' are rotated their respective projections 76 and 76' and the projections 73 and 74 on the washers 71 and 72, respectively, are moved into successive engagement in a stepped relation as is clearly shown in Fig. 1, and as was previously fully described. Since the gears 65 and 65' are rotated in opposite directions their coupled engagement with the projection 77 on the adjustable collar member 78 occurs on opposite portions of the projection 77. The gear first to be coupled with the projection 77 rotates the control shaft 57 by virtue of the fixed position of the collar member 78 on the shaft 57, until both gears are in coupled engagement with the member 78. Since the driving force of the gears 65 and 65' act on the projection 77 in opposite directions and since these opposite forces are equal to each other, the coupled engagement of both gears with the member 78 will lock the gears against any further rotation thereof and hence of the control shaft 57. This locked engagement of the gears 65 and 65' with the member 78 defines the predetermined control position of the shaft 57 and hence of the condenser 63, which is in driven engagement with the shaft 57 through gears 58 and 61, as was previously explained. Although the rotation of the motor is unidirectional the opposite rotation of the gears 65 and 65' provides for a rotation of the control shaft and hence of the condenser in either direction, the direction of rotation being dependent upon which gear 65 or 65' is first coupled to the adjustable member 78.

To adjust the various control units 54 to a predetermined control position screw 87 in the thrust mechanism 88 is withdrawn until the center washers or adjustable collars 78 are free to turn relative to the shaft 57. Shaft 57 is then adjusted to a desired control position by a suitable manual control knob (not shown) for the frequency changing means 63. With the shaft in this position a unit 54 is operated to its locked position by pushing a button 135, while the operator holds the manual control knob and hence the shaft 57 from turning. The member 78 is thus adjusted to a predetermined control position of the shaft 57. A similar procedure is repeated for the other control units 54. During this setting operation, the members 78 are maintained in adjustment by virtue of the fact that their frictional engagement with the bushings 66 and 67 is sufficient to maintain their relative positions on the shaft 57. Spring washer 86 keeps all parts on shaft 57 always under pressure for this purpose. When all of the units 54 have been adjusted the screw 87 is tightened whereby to frictionally lock all of the members 78 in fixed positions relative to the shaft 57.

The clutch means 106—117 are readily adapted for manual actuation instead of magnetic actuation by the arrangement illustrated in Figs. 9–18, inclusive. With reference to Fig. 9 the motor 26 is illustrated in driving engagement with the elongated pinion 44 through gears 37 and 43. Pinion 44 is placed in driving engagement with the gear train 53 through a manually actuated clutch unit 147, whereby to operate the control unit 54 in the manner hereinabove fully described in connection with Fig. 1.

Each clutch unit 147 is comprised of a pair of flat fingers or arms 148 and 149 of unequal length, which are pivotally supported at their ends 151 and 152, respectively, on the pinion shaft 97; the arms being assembled with their flat sides together and spaced between the pinions 92 in a manner similar to that above described in connection with the armatures 106. As shown in Figs. 14 and 15 the arms 151 and 152 are formed with corresponding grooves 153 and 154 which are adapted to have a continuous tension member 156 such as a spring or the like seated therein. The member 156 functions normally to maintain the arms 151 and 152 in transverse alignment, while providing for a relative slidable movement therebetween. The small arm 152 intermediate its ends has mounted thereon a rotary gear member 157 which is spaced from the arm 152 by a spacer 158; the spacer and gear being mounted on a pin 159 supported in the arm 152 (Figs. 16–18).

Arm 148 is formed with an actuating or lever portion 161 which extends through a slot 162 formed in a panel member or bracket 163 which is supported at its ends to the end plates 21 and 22 (Fig. 13). The rotary gear member 157 is positioned on the arm 149 so as to be in continuous meshing engagement with the pinion 92. A spring 164 connected at one end to the top of the bracket member 163 and at its opposite end to the arm member 148 serves to hold the arm against the upper end of the slot 162. This limiting position of the arm 148 holds the gear 157 out of engagement with the elongated pinion 44, since the arms 148 and 149 are normally pivotally movable together. Engagement of the rotary gear member 157 with the elongated pinion 44 to provide for a rotation of the pinions 92 and 93 is obtained by moving the lever portion 161 downwardly in the slot 162. This engagement is normally completed while the pinion 44 is in an idle or stationary position. The slot 62, however, is of a length to provide for a continued downward movement of the lever 161, after engagement of the gear 157 with the pinion 44, to permit its engagement with a switch or gate plate 166, which extends longitudinally of the frame means 20 and is pivotally supported as at 167 to the end plates 21 and 22. A contact 168 is provided on the lower side of the switch plate 166 and is arranged for engagement with a contact arm 169, the closing of these contacts effecting a closing of the motor circuit and a consequent operation of the motor 26. Downward movement of the lever 161 thus functions both to move the gear 157 into its engaging position with the pinion gear 44 and also to close the circuit of the motor 26 to operate the pinion 44. The switch plate 166 is normally tensioned by suitable spring means (not shown) so as to keep open the contacts 168 and 169. As shown in Fig. 12 the motor circuit is inductively connected with a suitable source of electric supply such as 170 and includes conductors 171 and 172 connected in series with the motor 26. Conductor 171 is connected with contact 168 through the switch plate 166 and conductor 172 is connected to the contact arm 169.

As previously mentioned, the motor 26 is of unidirectional type and is in driven engagement with the gears 37 and 43 in a manner to provide for a clockwise rotation of the pinion 44 as viewed in Fig. 9. This direction of rotation of the pinion 44, after engagement thereof with the rotary gear 157, serves to mechanically interlock the gear 157 with the pinion 44 even after release of the lever portion 161. However, since the lever 161 directly controls the circuit of the motor 26, as above explained, it is readily apparent that this interlocked engagement of the gears after release of the lever 161 would result in a continued energization of the motor circuit. In the movement of the lever 161 into engagement with the switch plate 166, the engagement of the gear 157 with the pinion 44 prior to a closing of the motor circuit serves to maintain the arm 149 in a held position while the arm 148 is moved into its motor operating position. This relative pivotal movement between the arms 148 and 149 occurs by virtue of the tension means 156. On release of the lever 161, the spring means 156 permits the lever 161 to be pulled upward by spring 164 to permit the gate 166 to swing upward to open the contacts 168 and 169, as shown in Fig. 11, whereby to deenergize the motor 26. On deenergization of the motor the torque on pinion 44 ceases and hence the rotary gear 157 is released, the clutch unit 147 being immediately returned to its idle position by the spring 164. A cushion spring 50 interconnecting gear 43 and hub 46 provides a kick back action to assure release of gear 157 from pinion 44 as already described.

In some instances it may happen that the gear 157 will not immediately mesh with the pinion 44 because of an abutting rather than a meshing engagement of the gear teeth, as indicated in Fig. 10. The arm 149 is thus held in a position above that normally attained on a meshing engagement of the gears 44 and 157. Should this occur the flexible connecting means 156 between the arms 148 and 149 permits the arm 148 to be moved into its engaging position with the switch plate 166 to close the contacts 168 and 169, this relative positioning of the arms 148 and 149 being shown in Fig. 10. Immediately on closing of the contacts 168 and 169 the pinion 44 is rotated by the motor 26, this rotation of the pinion 44 breaking the abutting engagement of the teeth portions, as indicated in Fig. 10, and permitting a meshing engagement between the rotary gear 157 and the pinion 44 as shown in Fig. 9. Since the operation of the tuning apparatus illustrated in Figs. 9 to 18, inclusive, is similar to that previously described in connection with Fig. 1 except for the manually actuated clutch unit 147, it is believed that a further description of the operation is unnecessary.

It has been noted that three washers 71 and three washers 72 are used in each of the control units 54. The number of washers, however, may be changed in accordance with a particular tuning structure, a larger number of washers providing for an increased driving ratio between the control unit 54 and shaft 57. This driving ratio provides for a relative free motion of the gears 65 and 65', between their locked positions, which is commensurate to the driving ratio between the shaft 57 and condenser shaft 62. A free motion of this degree in each unit 54 conditions each unit to move the condenser through its complete tuning range, which in the case of the usual gang condenser is a movement of about 180°. It is readily apparent, therefore, that as the driving ratio between the rotary control shaft 57 and condenser 63 is increased, the accuracy of the control unit 54 in moving the shaft 57 to a predetermined control position is increased, since the error of tuning is decreased in proportion to the increase in the driving ratio. In other words, the angular displacement of the condenser 63 is only a predetermined portion of that of the shaft 57, for any tuning operation. In the embodiment of Fig. 1, a driving ratio of about 3½:1 between the shaft 57 and condenser 63 has been found to give very satisfactory tuning results. Where a connection such as a flexible cable is used as a mechanical transmission means between a control knob and a condenser an appreciable angular displacement occurs in the cable so as to impair the precision of the tuning operation. In one commercial embodiment of the invention a driving ratio of 12:1 has been satisfactorily employed to reduce the degree of error in the tuning resulting from the use of a flexible cable.

A modification of the invention permitting 12 free revolutions of each of gears 65 and 65' is shown in Figs. 19-23, inclusive. This modification of the invention is similar in many respects to the embodiment shown in Fig. 1 and similar numerals of reference, therefore, will be used to designate similar parts.

The driving motor 26 is in driving engagement with the pinion assembly including pinions 44a, through clutch assembly 33 and gear 43, the pinion assembly in turn being connected with the pinion gear trains 53 by the clutch means 106'—117'. The shaft 45' (Figs. 21 and 22) is formed with opposed flat portions 173 for keyed engagement with the pinions 44A, mounted on the shaft 45', which are internally formed with mating flat portions, there being a pinion 44A for each control unit 54'. Armatures 106' are rotatably supported on the shaft 45' and arranged between adjacent pinions 44A. Each pinion 44A is in continuous engagement with a pinion 117' which is freely rotatable on a pin 118' mounted in the armature 106'. The armature is attractable by a magnet 109', the magnets being vertically arranged in the unit as shown in Figs. 21 and 22. The action of magnet 109' on its corresponding armature 106' is opposed by the action of a spring 111' which is connected at one end to a projection 112' and at its opposite end to a tie rod or rail 114' supported between the end plates 21 and 22. The armature 106' in its open position is held by the spring 111' against a non-magnetic rest rail 116' which is also mounted between the end plates 21 and 22. A brass stop or magnetic separator S (Figs. 21 and 22) is secured to the armature 106' in a position such that it engages the core of the magnet 109' when the armature is attracted thereto, so as to eliminate any possibility of the armature freezing to the magnet.

The pinions 92 and 93 are engageable with gears 165 and 165' of the control units 54', respectively. Besides the gears 165 and 165' each unit 54' includes an adjustable collar member 78' and a pair of sleeve members 174. The flat portions 69 formed on the shaft 57' are adapted for keyed engagement with corresponding broached flat portions formed internally of the sleeve members 174. Each sleeve member 174 is formed with an enlarged section and a reduced section, the reduced section 176 being adapted to have a gear 165 or 165' freely fully rotatable thereon. It is thus seen that although the sleeve members 174 are keyed relative to the shaft 57', that the gears 165 and 165' are freely rotatable relative to the shaft 57'.

In the assembly of each control unit 54', which are of similar construction, the sleeves 174 are arranged with their reduced sections 176 facing each other and with the adjustable member 78' positioned between such facing portions. Since the mounting portion on each member 174 for the gears 165 or 165' is of a greater length than the thickness of such gears, the pressing together of the control units during their assembly on the control shaft 57' does not bind the gears 165 and 165' relative to the shaft 57' but serves merely to frictionally engage the adjustable member 78' between each pair of sleeve members 174. The frictional engagement of the member 78' in a particular adjusted position corresponding to a predetermined control position of the shaft 57' is obtained by manipulation of the clamping mechanism 88, previously explained.

The adjustable collar member 78' is formed with a radially extending abutment 177 of rounded gear tooth contour. This abutment is formed and arranged so as to be engageable with pinions 178 and 178' which are rotatably supported on pins 179 and 179' mounted in the face portion of each gear 165 and 165', respectively. In the assembly of each pinion 178 and 178' a spring washer 181 (Fig. 23) is arranged on the pin 179 between the pinion and the pin head 182 so as to effect a slight drag or frictional pressure on the pinion. This pressure is just enough to prevent the pinions 178' and 178 from moving out of a meshing position with the abutment 177 on rotation of the gears 165 and 165'. The toothed contour of each of the pinions 178 and 178' is formed with a blank portion 183 which is equivalent substantially to the width of two gear teeth. With the adjustable collar member 78' fixed relative to the control shaft 57', and the shaft 57' in a stationary position, it is seen that each complete rotation of gear 165, as shown in Figs. 21 and 22, rotates the pinion 178 about the pin 179 a distance equal to one tooth, by reason of its engagement with the projection 177 on the member 78'. The progressive rotation of the pinion 178 about the pin 179 continues until the portion 183 engages the tooth 177, this coupled engagement serving to lock the member 78' and the gear 165 relative to the shaft 57' so that any further rotation of the gear 165 also rotates the shaft 57'.

With the pinions 92 and 93 in continuous engagement with each other and arranged to rotate the gears 165 and 165' in opposite directions the blank portions 183 on the pinions 178 and 178' will engage opposite sides or portions of the tooth 177. A locked engagement, therefore, of each pinion 178 and 178' with the tooth 177 thus locks the gears 165 and 165' relative to the control shaft 57', this locked engagement defining the predetermined control position of the shaft 57'. The gear 165 or 165' first engaged in a coupled connection with the adjustable member 78' by the locking action of its associated pinion with the tooth 177 serves to rotate the shaft 57' in a given direction until a position is reached which brings about a coupled connection between the member 78' and the uncoupled gear, thus locking both gears 165 and 165' against any further rotation.

Although the pinions 178 and 178' are indicated as providing for a relative rotational movement of six revolutions between the gears 165 and 165' to correspond with a desired 12:1 driving ratio between the control shaft 57' and condenser 63', it is to be understood that the gears 165 and 165' and pinions 178 and 178' can be altered in size to provide for a wide variation of the free motion in the control unit 54'.

The structure of each control unit 54' provides for a high driving ratio between the control shaft 57' and condenser 63', without increasing the bulk of the tuning device as might occur with the washer assembly in the control units 54 of Fig. 1. A very compact and highly efficient tuning apparatus is thus provided which is readily applicable to a variety of tuning requirements.

The operation of embodiment in Figs. 19–23, is substantially similar to the operation of the embodiment of Fig. 1, the circuit diagram of Fig. 32 being applicable. On energization of a magnet 109' by a push button 135' the motor 26 is also energized through the double set of contacts 110 and 110' whereby the pinion assembly 44' is rotated substantially simultaneously with the actuation of the clutch means 106'–117'. That is, upon pushing a button 135', the corresponding magnet 109' is first energized by engagement of button contact with battery contact 110'. Continued pressure upon the button brings the contact 110' into engagement with motor contact 110. The contacts 110' are in a common circuit. The pinion assembly 44' is arranged to rotate in a counterclockwise direction, as viewed in Figs. 21 and 22, so as to rotate the pinion 117' in a clockwise direction. This direction of rotation of the pinion assembly 44' aids in bringing the pinion 93 and gear 117' into meshed engagement. Since the mechanical action of the pinions 44A and 93 aids the operation of the magnets 109' in effecting the meshed engagement only relatively small magnets 109' are needed. Rotation of the pinion gears 92 and 93 to oppositely rotate the control unit gears 165 and 165' actuates the pinion or coupling means 178 and 178' to couple the gears 165 and 165' with the adjustable member 78'. On rotation of the pinions 178 and 178' into their respective locked positions relative to the tooth 177, the gears 165 and 165' are locked on the control shaft 57', the control shaft 57' being rotated to its predetermined control position prior to such locking engagement in the manner previously explained. In practice the push button 135' may be held closed until the shaft 57' has turned the condenser 63' to its predetermined tuning position.

The adjustment of the members 78' to a desired setting of the control shaft 57' is obtained in a manner similar to that previously described for the members 78 in Fig. 1 the frictional locking of the members 78' being controlled by the cooperative action of the clamping mechanism 88 and the releasable spring 86 positioned between the washers 83 and 84.

Yet another modification of the invention is illustrated in Figs. 24–31, inclusive. As shown in Fig. 24 this embodiment includes a stationary or fixed shaft 186 which is mounted in end plates 187 and 188. A rotary control or drive shaft 189 for a frequency changing means (not shown) is arranged parallel with the shaft 186 and is rotatably supported in the end plates 187 and 188. A pair of gears 191 and 192 for each control unit 193 are freely rotatable on the stationary shaft 186. Each adjacent pair of gears 191 and 192 are separated by spacers 194 while the gears 191 and 192 in each pair are separated by spacers 196. Spacers 194 and 196 are also freely rotatable on the shaft 186 so as not to interfere in any way with the free rotation of the gears 191 and 192. Each gear 191 is in meshing engagement with a motor driven driving gear 197 which is mounted on a shaft 198. A plurality of motors 199 are provided, one for each control unit 193 to drive the gear 197 therein, the stationary shaft 198, and motors 199 being arranged below and between the shafts 186 and 189. The shaft 198 is parallel with the shafts 186 and 189 and is suitably supported in the frame means for the tuning apparatus. The rotors 197A of the motors rotate on shaft 198 which may be stationary.

Each driving gear 197 is also in engagement with a gear 201 which is freely rotatable on a sleeve or bushing 202 mounted on and splined with the rotary drive shaft 189. The gear 201 is in operative engagement with an adjustable element 203 of gear form by means of a coupling unit 204, to be later explained. The adjustable element 203 is normally adjustably fixed on the shaft 189 and is in continuous engagement with the gear 192 mounted on the shaft 186. The spacer or bushing member 202 is formed with a shoulder portion 206 and a reduced section for carrying the gear 201. A spacer 207 is mounted on the reduced section of the bushing 202 between the gear 201 and the adjustable element 203. The gear 201 and element 203 of each control unit 193 is separated from the next adjacent control unit by spacers 208, the control units adjacent the end plates 187 and 188 being separated therefrom by collar or spacer members 209. Adjustment of the element 203 in a fixed position relative to the control shaft 189 is accomplished by its frictional engagement between the reduced section of the bushing 202 and one end of a spacer member 208, as is clearly indicated in Fig. 24. The frictional pressure on the adjustable elements 203 is controlled by the clamping unit 88 and the spring washer unit 83—86, which were hereinabove fully described.

As shown in Figs. 26–30, inclusive, each adjustable element 203 is press formed with a corrugated face portion 211 which is spirally arranged to provide for the traversal thereof of a lever or traversing arm 212, which is pivotally supported on the face of gear 201. The arm 212 is formed with a pointed follower 215 which rides in the spiral corrugations of the portion 211. It is to be understood that this corrugated structure is applicable to all of the adjustable elements 203 indicated in Fig. 24, it being apparent that this structure could not be readily shown in Fig. 24 because of the comparative size thereof. As illustrated in Fig. 25, each of the gears 192 is also formed with a corrugated face portion 211' of spiral arrangement while each of the corresponding gears 191 is provided with a pivotally supported traversing arm 212'. The travel of the traversing arm 212, in one direction of rotation of the gear 201, is limited by an inner abutment or stop 213 while the limit of its travel in the opposite direction is defined by an outer abutment 214, the abutments 213 and 214 being integrally formed in the adjustable element 203 by bumping out portions thereof. The travel of the traversing arm 212' is similarly defined by abutment members 213' and 214', which are integrally formed in the gears 192.

On rotation of a driving gear 197 there occurs a rotation of the gears 191 and 201, to provide for a traversal of the arms 212, 212' over the corrugated portions 211 and 211' of the gears 203 and 192, respectively. The gears 191 and 201 are rotated in the same direction since they are both driven by the same rotating gear 197. Gear 192 will remain in a stationary or idle position until coupling engagement thereof with the gear 191 occurs by the abutting engagement of the traversing arm 212' against one of the abutments 213' or 214'. When this engagement occurs the gear 192 will be rotated in the direction of rotation of gear 191. By virtue of this driving engagement and the continuous meshing engagement of the gear 192 with the adjustable element 203, the element 203 will be rotated to drive the rotary control shaft until the traversing arm 212 engages one of the abutments 213 or 214. The continuous engagement of the gears 192 and 203 provides for opposite relative rotation of these two gears. On the occurrence of a stopped engagement of both of the traversing arms 212 and 212' the adjustable element 203 and its associated gears 191, 192, and 201 are locked in fixed positions relative to the shafts 186 and 189, which locked position defines a predetermined control position of the drive shaft 189.

It is to be understood that the adjustable element 203 is not always rotated by the gear member 192 since a coupled engagement between the gear 201 and the element 203 might occur before a coupled engagement between the gears 191 and 192, in which case the gear 192 will be rotated by the adjustable gear or element 203 and the coupled engagement of the gear 201 and element 203 will provide for the rotation of the control shaft 189 to its predetermined control position, prior to the locking of the gears 192 and 203. It is to be understood further that the amount of relative free motion of the gears before locking is readily provided by varying the extent of the spiral portions 211' and 211. The control units 193 are thus readily adapted to be made in conformance with a particular driving ratio between the rotary control shaft 189 and its associated frequency changing means (not shown).

A control circuit for the embodiment of Fig. 24 is shown in Fig. 31. The motors 199 for each control unit 193 are arranged in parallel between conductors 216 and 217, which are inductively connected to a suitable source of electrical supply 218. The radio receiving apparatus (not shown) is conditioned for operation by the "on" switch 219 and the "off" switch 221, which control the energization of the radio circuits through relay coil 127' and 128' as in Fig. 8. A muting relay, including magnet 220 and armature 220', is indicated at 222. With the radio set turned on a push button 223 which may be remotely located is closed. The corresponding individual motor 199 is immediately energized whereby gear 197 is driven to operate the control unit 193 in the manner above fully described. Since the tuning operation is of very short duration, the push button 223 is held closed manually for the duration thereof.

In the adjustment of the control members 203 the clamping unit 88 is released so that all of the control elements 203 are free to turn on the control shaft 189. The control shaft 189 is then rotated to a predetermined control position and held in such position while a control unit 193 is operated by the push button and motor to its locked position. This procedure is repeated for the remaining elements 203 until all of them have been adjusted. The clamping unit 88 is then tightened to maintain the control units in their adjusted positions.

It is to be understood that only preferred embodiments of the present invention have been illustrated and described herein and that modifications and alterations thereof can be made which are within the full intended scope of the invention as defined by the appended claims.

I claim:

1. Electrical rotary control apparatus adapted to be operated to predetermined stop positions including in combination unidirectional rotary driving means, reversible rotary driven means, and a plurality of rotary coupling units operatively connecting said two means and aligned axially relatively to one another in said apparatus, each of said plurality of rotary coupling units having movable interconnected structure including a driving rotary gear portion, rotatable toothed reversing means operatively connected with the driving rotary gear portion, and means including adjustable means and lost motion means operatively connecting said reversing means and said reversible rotary driven means, with all of the movable structure in each coupling unit interconnected in a manner so that such structure always moves to the same relative position at each predetermined stop position for the apparatus.

2. Electrically driven rotary control means including in combination, rotary driving means having unidirectional motor means and a rotary gear portion, a rotary shaft, a rotary control unit corresponding to said rotary gear portion, said control unit including a member on said rotary shaft and gear-toothed means including a pair of rotating gears, lost motion coupling means operatively connecting the member and said pair of rotating gears, with said rotary gear portion being in meshing engagement with gear teeth in said control unit, and means for selectively operating the rotary gear portion and the rotary control unit.

3. Electrically driven rotary control means including in combination a rotary driven shaft, a plurality of rotary control units each including a pair of gears oppositely rotatable relative to one another and including an engaging member, with said engaging member and at least one of the oppositely rotatable gears mounted on said rotary driven shaft, rotary shaft means having gear means thereon operatively connected with said pair of gears and said pair of gears being relatively and oppositely rotatable upon rotation of said shaft and gear means, rotary drive means, means including said plurality of control units operatively connecting said rotary drive means and said rotary driven shaft and said means additionally including a plurality of rotary gear portions corresponding to said plurality of control units and each gear portion operatively meshingly connected with a rotary gear member in the corresponding control unit, and means for selectively operating a rotary gear portion and its corresponding rotary control unit.

4. Control apparatus including in combination supporting means, a driven member rotatable relative to the supporting means, two driving members journalled for opposite rotation relative to one another and for rotation relative to the supporting means and the driven member, lost motion coupling means coupling the driven and the driving members, rotary means journalled for rotation relative to the supporting means and interconnecting the driving members, and selectively operable means including a rotary member for providing a driving force for the driving members for accomplishing rotation of said driving members and said driven member to a predetermined position relative to the supporting means.

HAROLD F. ELLIOTT.